J. P. BURKE.
FASTENER.
APPLICATION FILED MAR. 10, 1919.

1,342,738.

Patented June 8, 1920.
2 SHEETS—SHEET 1.

WITNESSES
Frank C. Palmer.

INVENTOR
James P. Burke
BY
ATTORNEYS

J. P. BURKE.
FASTENER.
APPLICATION FILED MAR. 10, 1919.

1,342,738.

Patented June 8, 1920.
2 SHEETS—SHEET 2.

WITNESSES

INVENTOR
James P. Burke
BY
ATTORNEYS

UNITED STATES PATENT OFFICE.

JAMES PATRICK BURKE, OF STRUTHERS, OHIO.

FASTENER.

1,342,738.  Specification of Letters Patent.  Patented June 8, 1920.

Application filed March 10, 1919. Serial No. 281,580.

*To all whom it may concern:*

Be it known that I, JAMES P. BURKE, a citizen of the United States, and a resident of Struthers, in the county of Mahoning and State of Ohio, have invented a new and Improved Fastener, of which the following is a description.

My invention relates to a fastener which in general is of the ball and socket type and more particularly relates to a fastener especially adapted for garments and made up in whole or for its major portion of wire.

The distinguishing features of the invention will appear from the specific description following, an important characteristic being that the device is well adapted for the fastening of garments in that it can be made very small to occupy little space in situations where space is an important factor, and furthermore, the fastener elements are inconspicuous and may be rendered practically invisible when colored to suit the fabric to which it is to be applied.

Reference is to be had to the accompanying drawings forming a part of this specification, it being understood that the drawings are merely illustrative of one example of the invention.

Figure 3:
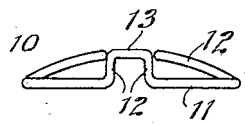
Fig. 3 is a side elevation of the socket element.
Figure 5:
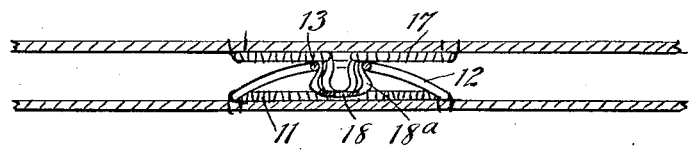
Fig. 5 is a vertical section showing the ball and socket elements in engagement.

The socket element of my improved fastener designated generally by the numeral 10 is made of a continuous wire bent to form radially disposed members 11, generally of triangular shape and preferably curved at the peripheral or outer side to give said members a sector shape. The side arms 12 of each member 11 are thus convergent and the adjacent side arms 12 of adjacent members 11 are spaced apart for convenience in receiving stitches; said adjacent arms 12 are joined at their inner ends by connecting bars 13, each bar 13 with two adjacent arms 12 presenting a U-shape. Each bar 13 is curved approximately in the arc of a circle, so that jointly the respective bars define a central opening 14 to receive the head or ball member of the ball element 15 of the fastener. The element 10 is concave as a whole, the arms 12 being curved forwardly and inwardly as will be clear from Figs. 3 and 5 thereby imparting the needed resiliency and at the same time serving to so receive the ball element of the fastener that the ball head when engaged with the socket element will terminate in the plane of the latter and not project, whereby the head when secured to one portion of a garment to be fastened will be maintained out of contact with the part of the fabric or garment to which the socket is applied so that the latter fabric portion or garment will be prevented from being bulged by the ball head.

The ball member 15 is formed with a base composed of essentially triangular or sector-shaped sections 16, the side arms 17 of which converge, said sections including their arms 17 lying in the same horizontal plane and constituting the flat base of the ball element 15. The ball head is composed of approximately U-shaped members 18 that join adjacent arms 17 of adjacent sections 16, said members 18 curving forwardly from the plane of the sections 16 and being deflected laterally inward toward one another so that jointly the members 18 form the ball head. The material of the members 18 is flattened and said members present outward bends between the base of the element 15 and the terminals of the members 18 as indicated at 18$^a$, thereby giving the approximate ball form and shouldered character to the head to be snapped into the opening 14. The arcuate form of the bars 13 gives a substantial contact with the ball head so that the ball has a more effective bearing against the socket to place the socket under greater stress in effecting the engagement of the fastener elements to insure a secure holding engagement thereof. It will be observed that the individual elements 18 correspond in number and positions with the number and positions of the arcuate bars 13 so that the individual bars 13 may engage corresponding elements 18 or the elements 18 may engage adjacent portions of two adjacent bars 13.

Figure 6:
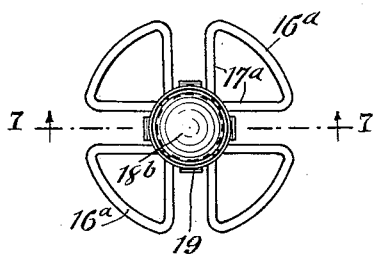
Fig. 6 is a plan view of a modified form of ball element.
Figure 7:
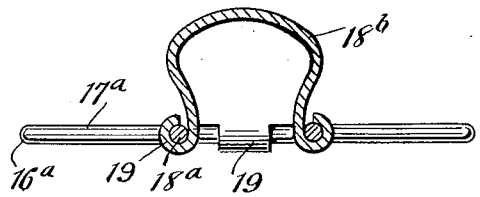
Fig. 7 is a section on the line 7—7, Fig. 6.

In Figs. 6 and 7 a modification of the ball element is shown in which the base is formed of a wire frame presenting essentially triangular or sector-shaped sections $16^a$ having convergent side arms $17^a$, adjacent side arms of adjacent sections being joined at their inner ends by cross bars or members $18^a$ in the plane of the base. In this form the head or ball $18^b$ of the ball member is stamped from sheet metal and formed at the bottom with ears or tongues 19 which are bent about the members $18^a$ of the base frame.

Figure 1:
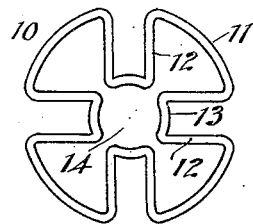
Figure 1 is a plan view of the socket member.
Figure 2:
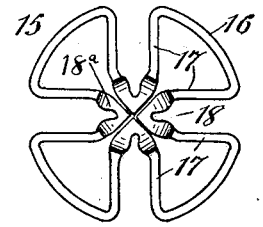
Fig. 2 is a plan view of the ball or male element.
Figure 4:
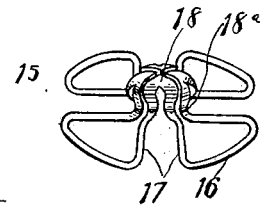
Fig. 4 is a perspective view of the ball element.
Figure 8:
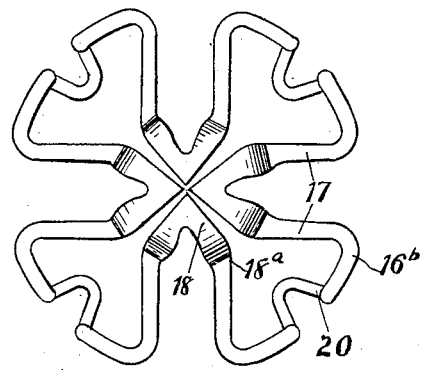
Fig. 8 is a view similar to Fig. 2 but showing a ball fastener with a modified means of securing the base in position by fastening members in lieu of sewing.
Figure 9:
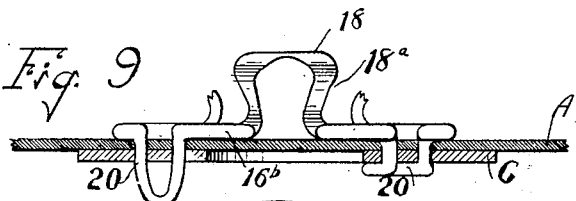
Fig. 9 is a side elevation of a fragment of the ball element shown in Fig. 8, the view showing the base with one of the securing members in the form in which it is passed through a curtain or the like and showing another of the securing members upset into clenching form.
Figure 10:
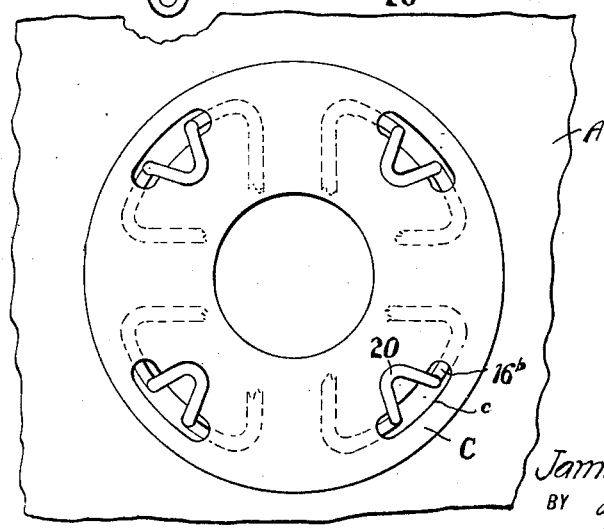
Fig. 10 is an underside view of the base provided on the ball or socket element of the fastener when employing the securing means illustrated in Figs. 8 and 9.

In Figs. 8 to 10 is shown a means for securing either the ball or socket member of the fastener to a curtain or the like without sewing, for which purpose the base sections $16^b$ are each formed with a securing member approximately central thereon in the form of an approximately U-shaped device as at 20 adapted to penetrate the material A of a curtain for example and also, a disk or washer C if desired. At the left of Fig. 9 is shown the securing member 20 after penetrating the article to which the fastener element is to be secured and at the right of Fig. 9 the securing member is shown upset. The disk C is made with arcuate slots $c$ for the members 20 when said disk is employed. The head 18 and the arms 17 in the ball element shown in Figs. 8 and 9 correspond in all respects with the similar features in Figs. 2 and 4.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. A fastener including a ball element and a socket element, said socket element being formed of wire presenting an annular rim comprising equally spaced sections to which attaching means are secured, said sections terminating in side arms convergent inwardly and curved upwardly from the plane of said rim, adjacent side arms of adjacent sections being joined at their inner ends by arcuate connecting bars, curved to define a central circular opening to receive the ball or head of the ball element.

2. A fastener comprising ball and socket elements, the ball element having a base formed of wire presenting approximately triangular sections having side arms convergent inwardly, adjacent side arms of adjacent sections being joined by approximately U-shaped bars disposed upwardly and having their terminals directed inwardly toward one another to form a reduced shank, and their center portions curved outwardly and then inwardly to constitute the head of the ball element, the material of said head being flattened.

3. A fastener element of the class described having a base formed of wire and presenting sections, the material of which is bent rearwardly to present approximately U-shaped securing members adapted to penetrate the material to which the fastener element is, to be secured, said U-shaped members being bendable laterally to upset the same at the inner side of the material.

4. A fastener comprising ball and socket elements, the ball element comprising a head and a base formed of wire presenting an annular rim comprising equally spaced sections to which attaching means are secured, said sections terminating in side arms convergent inwardly, adjacent side arms of adjacent sections being joined by curved connecting bars at their inner ends to present a round conformation.

JAMES PATRICK BURKE.